Oct. 25, 1949.                    D. CHRISTENSEN                    2,486,003
                                  AUTOMOBILE HOOD LOCK
                                  Filed March 18, 1947
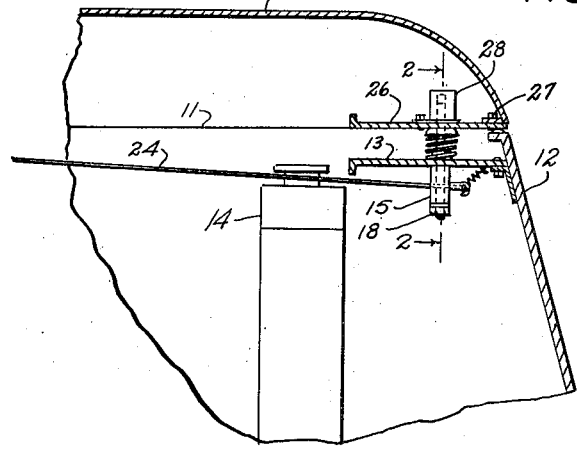
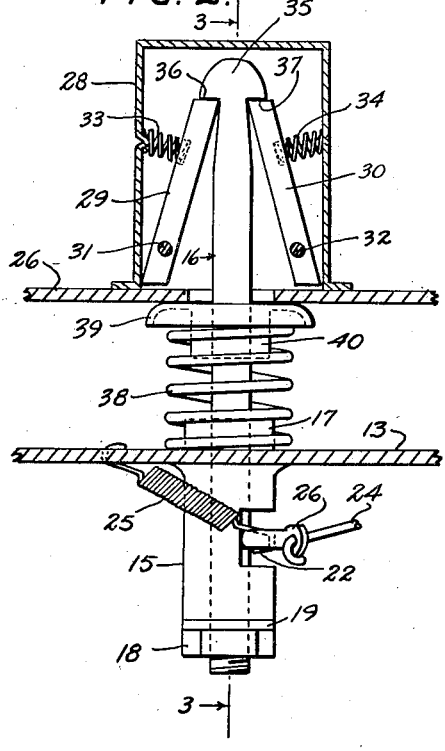
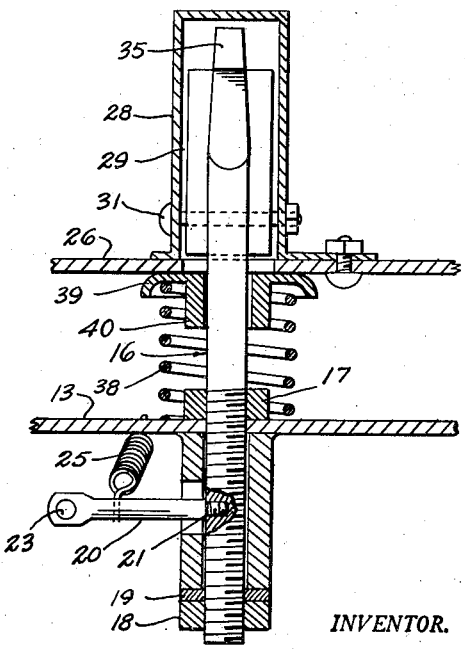
INVENTOR.
DELBERT CHRISTENSEN,
BY
                    ATTORNEYS.

Patented Oct. 25, 1949

2,486,003

UNITED STATES PATENT OFFICE 2,486,003

AUTOMOBILE HOOD LOCK

Delbert Christensen, Brainerd, Minn.

Application March 18, 1947, Serial No. 735,304

1 Claim. (Cl. 292—59)

This invention relates to improvements in hood locks for automobiles and particularly to a lock to be disposed at the front end of an automobile hood, the rear end of which is pivoted or hinged to the cowl of the automobile body.

While automobiles are conventionally provided with hood latches these conventional latches have been found deficient in certain respects, mainly in that they do not sufficiently preclude unauthorized opening of the automobile hood, do not always automatically latch the hood down when it is lowered from a raised position, and do not sufficiently prevent vibration and rattling of the hood on the hood supporting structure.

It is therefore among the objects of the present invention to provide a simple and inexpensive hood latch device which will effectively preclude unauthorized opening of the automobile hood but is easily operated by an authorized person from within the passenger compartment of the automobile to release the hood, positively and automatically latches the hood down whenever the hood is lowered from a raised position, and effectively prevents vibration or rattling of the hood on its supporting structure.

A further object resides in the provision of an improved automobile hood latch which can be installed without requiring any material modifications of the conventional automobile hood and the supporting structure therefor, which can be easily adjusted to maintain the hood in a tightly closed condition relative to its supporting structure, and which will not bind or jam or be subject to rapid wear or other malfunctioning in use.

Other objects and advantages will become apparent from a consideration of the following description in conjunction with the accompanying drawing wherein:

Figure 1 is a longitudinal sectional view of a fragmentary portion of a conventional automobile hood and grille structure showing the application thereto of an improved latch device illustrative of the invention.

Figure 2 is a sectional view on an enlarged scale taken on the line 2—2 of Figure 1, and Figure 3 is a longitudinal sectional view on the line 3—3 of Figure 2.

With continued reference to the drawing, the hood 10 comprises a concavely curved sheet metal member the lower edge 11 of which rests upon the upper edge of a supporting structure 12 which may constitute the conventional grille and front fenders of an automobile.

A transverse plate 13 extends inwardly of the grille 12 near its upper edge towards the radiator coil 14, and a tubular sleeve member 15 is secured at its upper end to the under surface of the plate 13 with its bore in alignment with an aperture in the plate.

A locking shaft, generally indicated at 16, has its lower end portion journalled in the sleeve 15 and retained in the sleeve against longitudinal movements relative thereto by abutment nuts 17 and 18 screw-threaded onto the externally screw-threaded lower end portion of the shaft. The nut 17 is positioned in contact with the upper portion of the plate 13 and the nut 18 is threaded onto the lower end of the shaft 16 at the lower end of the sleeve 15, a suitable washer 19 preferably being interposed between the nut 18 and the lower end of the sleeve. The nuts 17 and 18 may be locked in adjusted position by suitable conventional locking means not illustrated.

A lever arm 20 is secured at one end to the shaft 16 by having a reduced externally screw-threaded end portion thereof threaded into an internally screw-threaded recess in the shaft, as indicated at 21 in Figure 3. The lever is disposed substantially at right angles to the shaft and extends through an opening 22 in one side of the sleeve 15. At its outer end this lever member 20 is flattened and provided with an aperture 23 which receives the corresponding end of a pull cable or wire 24 which extends below the hood 10 and into the passenger compartment of the vehicle where it is provided with a suitable pull-knob, not illustrated. A coiled tension spring 25 is connected at one end to the lever 20 and at its opposite end to the plate 13 and acts to resiliently pull the lever in a direction opposite to that in which the lever is pulled by the pull-cord or wire 24.

With this construction it is apparent that a pull on the cord or wire 24 will rotate the shaft 16 in one direction and when the pull on the cord 24 is released the spring 25 will return the shaft to its original position. This rotation of the shaft 16 is effective to release the hood locking means so that the hood can be raised and a rotation of the shaft of approximately ninety degrees has been found to be particularly satisfactory for this purpose.

The hood 10 is provided in the front end portion thereof with an inwardly extending plate 26 which is secured to the lower edge of the hood by suitable means, such as screws or bolts 27 extending through the marginal portion of the plate and an internal flange provided within the hood, this plate 26 being preferably substantially parallel to the plate 13 when the hood is in closed position. A hollow cup 28 preferably of rectangular cross sectional shape is secured to the upper surface of the plate 26 with its open end against the plate and substantially centered on an aperture provided in plate 26 which is in alignment with the aperture in plate 13 through which the shaft 16 extends. A pair of latch dogs 29 and 30 are pivotally secured in the cup member 28 by pivot pins 31 and 32 which pass through the lower portions of the latch dogs and are secured at their ends in the cup. These latch dogs may conveniently be formed of straight metal pieces of substantially rectangular cross-section having their ends displaced by a slight angle from planes perpendicular to the longitudinal center lines of the corresponding dogs. The two latch dogs are diametrically opposed in the cylindrical cup 28 and are resiliently urged together at their upper ends by corresponding coiled compression springs 33 and 34 compressed between the respective latch dogs and the sides of the cup ember 28.

The upper end portion of the shaft 16 is flattened on two opposite sides and tapered inwardly toward the upper end thereof, as is clearly illustrated in Figure 3, and is provided at its upper end with a flattened head 35 the lower surface of which constitutes a pair of diametrically opposite shoulders 36 and 37 which overlie the upper ends of the latch dogs 29 and 30 respectively when the device is in locking condition, as illustrated in Figure 2.

A coiled compression spring 38 surrounds the portion of the shaft 16 between the plates 13 and 26 and bears at its upper end against a cap or washer 39 which has an apertured sleeve portion 40 which surrounds the shaft 16 within the upper end of the spring.

The operation of the hood locking device is substantially as follows:

Assuming that the hood is locked down, as illustrated in the drawing, a pull on the cord or wire 24 will rotate the shaft 16 through approximately ninety degrees against the force of spring 25. This will turn the flat head portion 35 to a position in which the shoulders 36 and 37 leave the upper ends of the dogs 29 and 30 and are disposed between the upper ends of the dogs. The compression spring 38 will then force the plate 26 upwardly away from the plate 13 thereby raising the hood 10 an amount sufficient to prevent reengagement of the head 35 with the latch dogs. The hood 10 may then be manually raised to its fully opened position in which it will be releasably latched by the retaining means conventionally provided. Upon release of the pull cord or wire 24 the spring 25 will return the shaft 16 to its locking position. When the hood 10 is released and forced downwardly the cup 28 will be forced down over the upper ends of the shaft 16 and the shaft head 35 will pass between the dogs 29 and 30 forcing the upper ends of these dogs outwardly against the force of the compression springs 33 and 34 until the surfaces of the shoulders 36 and 37 reach the top end surfaces of the latch dogs. When this occurs the two latch dogs will snap inwardly so that their upper ends will come under the shoulders provided by the head 35 in which position the hood is locked down against the hood supporting structure. The spring 38 will be somewhat compressed when the hood is in its locked down position exerting a resilient force between the plates 13 and 26 to prevent the hood from vibrating or rattling against the upper edge of the supporting structure, such as the grille and front fenders of the automobile. The exact position of the lower edge of the hood relative to the upper edge of the supporting structure can be adjusted by shifting the nuts 17 and 18 along the screw-threaded lower end portion of the shaft 16 so that the shaft head 35 will be located at the exactly correct height above the plate 13 to latch the hood in the desired closed position.

The broad surface contact between the upper ends of the dogs 29 and 30 and the shoulders provided by the head 35 precludes the possibility of rapid wear of the locking parts, the closed cup member 28 firmly secured to the plate 26 and surrounding the locking mechanism effectively prevents unauthorized opening of the hood by the insertion of tools between the hood and the supporting structure 12, the resilient pressure exerted on the dogs 29 and 30 by the compression springs 33 and 34 assures that the hood will be automatically locked in closed position whenever it is lowered into contact with the supporting structure. The compression of the spring 38 is effective to eliminate any rattling or vibration of the hood on the supporting structure. As the spring 35 is adequately effective to return the shaft 16 to its hood locking position whenever the manual pull on the cord or wire 24 is released, there is no danger of the hood failing to lock when it is lowered to closed position.

The entire device is simple and inexpensive in construction and can be easily installed as it is only necessary to secure the plate 26 with the cup member 28 attached thereto and the plate 13 with the depending sleeve member 15 attached thereto to the conventional automobile structure by ordinary screws or bolts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claim are therefore intended to be embraced therein.

What is claimed is:

An automobile hood lock comprising a fixed plate having a sleeve depending therefrom; a shaft rotatably secured in said sleeve and extending through said plate and provided on the upper end thereof with a locking head; an arm extending outwardly from said shaft through an opening in said sleeve; a tension member connected to the outer end of said arm to enable manual rotation of said shaft; a tension spring connected to said arm resiliently resisting manual rotation of said shaft; a hood carried plate apertured to receive the upper end portion of said shaft; a cup secured on the upper surface of said hood carried plate and arranged to admit the upper end of said shaft; a pair of locking dogs in said cup engageable with the locking head; and a compression spring surrounding said shaft between said plates and urging said hood upwardly.

DELBERT CHRISTENSEN.

REFERENCES CITED

The following references are of record in the file of this patent:

UNITED STATES PATENTS

| Number | Name | Date |
| --- | --- | --- |
| 1,462,727 | Williams | July 24, 1923 |
| 1,967,627 | Riley et al. | July 24, 1934 |
| 2,275,740 | De Orlow | Mar. 10, 1942 |
| 2,357,049 | Leonard | Aug. 29, 1944 |